United States Patent
Jindal et al.

(10) Patent No.: US 11,615,176 B2
(45) Date of Patent: Mar. 28, 2023

(54) REGISTRATION AND VERIFICATION OF BIOMETRIC MODALITIES USING ENCRYPTION TECHNIQUES IN A DEEP NEURAL NETWORK

(71) Applicant: Tata Consultancy Services Limited, Mumbai (IN)

(72) Inventors: Arun Kumar Jindal, Gurgaon (IN); Imtiyazuddin Shaik, Hyderabad (IN); Harika Narumanchi, Chennai (IN); Vasudha Kumari, Pune (IN); Srinivasa Rao Chalamala, Hyderabad (IN); Rajan Mindigal Alasingara Bhattachar, Bangalore (IN); Sachin Premsukh Lodha, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 234 days.

(21) Appl. No.: 17/029,600

(22) Filed: Sep. 23, 2020

(65) Prior Publication Data

US 2021/0211291 A1    Jul. 8, 2021

(30) Foreign Application Priority Data

Jan. 8, 2020  (IN) .............................. 202021000863

(51) Int. Cl.
*G06F 21/32*      (2013.01)
*G06N 3/04*       (2023.01)
(Continued)

(52) U.S. Cl.
CPC .............. *G06F 21/32* (2013.01); *G06N 3/04* (2013.01); *G06N 3/08* (2013.01); *G06V 10/454* (2022.01);
(Continued)

(58) Field of Classification Search
None
See application file for complete search history.

(56) References Cited

U.S. PATENT DOCUMENTS

| 11,301,586 B1* | 4/2022 | Poh ........................ H04L 9/3231 |
| 2013/0031059 A1* | 1/2013 | Ravikumar ........... G06F 16/325 |
| | | 707/667 |

(Continued)

FOREIGN PATENT DOCUMENTS

| WO | WO-2019034589 A1 * | 2/2019 | ......... G06K 9/00006 |
| WO | WO-2019173562 A1 * | 9/2019 | ............. G06F 21/32 |

OTHER PUBLICATIONS

Navin Goel, George Bebis, Ara Nefian, "Face recognition experiments with random projection," Proc. SPIE 5779, Biometric Technology for Human Identification II, (Mar. 28, 2005); https://doi.org/10.1117/12.605553 (Year: 2005).*

(Continued)

*Primary Examiner* — Saleh Najjar
*Assistant Examiner* — Shadi H Kobrosli
(74) *Attorney, Agent, or Firm* — Finnegan, Henderson, Farabow, Garrett & Dunner LLP

(57) ABSTRACT

Conventionally, biometric template protection has been achieved to improve matching performance with high levels of security by use of deep convolution neural network models. However, such attempts have prominent security limitations mapping information of images to binary codes is stored in an unprotected form. Given this model and access to the stolen protected templates, the adversary can exploit the False Accept Rate (FAR) of the system. Secondly, once the server system is compromised all the users need to be re-enrolled again. Unlike conventional systems and approaches, present disclosure provides systems and methods that implement encrypted deep neural network(s) for biometric template protection for enrollment and verifi- (Continued)

cation wherein the encrypted deep neural network(s) is utilized for mapping feature vectors to a randomly generated binary code and a deep neural network model learnt is encrypted thus achieving security and privacy for data protection.

15 Claims, 5 Drawing Sheets

(51) Int. Cl.
- *G06N 3/08* (2023.01)
- *H04L 9/00* (2022.01)
- *H04L 9/08* (2006.01)
- *H04L 9/32* (2006.01)
- *G06V 10/82* (2022.01)
- *G06V 10/44* (2022.01)
- *G06V 40/10* (2022.01)
- *G06V 40/50* (2022.01)

(52) U.S. Cl.
CPC ............. *G06V 10/82* (2022.01); *G06V 40/10* (2022.01); *H04L 9/008* (2013.01); *H04L 9/0866* (2013.01); *H04L 9/0877* (2013.01); *H04L 9/3231* (2013.01); *G06V 40/53* (2022.01)

(56) References Cited

U.S. PATENT DOCUMENTS

2015/0341349 A1* 11/2015 Mandal ................... G06F 21/32 726/7
2020/0036707 A1* 1/2020 Callahan ................. H04L 67/53

OTHER PUBLICATIONS

Boddeti, Vishnu; Secure Face Matching Using Fully Homomorphic Encryption; 2018; arXiv; 1-10; https://arxiv.org/pdf/1805.00577.pdf (Year: 2018).*

Nazeer, Shahrin; Omar, Nazaruddin; Khalid, Marzuki; Face Recognition System using Artifical Neural Networks Approach; 2007; 420-425; https://ieeexplore.ieee.org/stamp/stamp.jsp?tp=&arnumber=4156656 (Year: 2007).*

Gomez-Barreroa, Marta et al., "Multi-biometric template protection based on Homomorphic Encryption", Pattern Recognition, Jul. 2017, vol. 67, pp. 149-163, Elesevier, http://atvs.ii.uam.es/atvs/files/2017_PR_multiBtpHE_marta.pdf.

Jindal, Arun Kumar et al., "Face Template Protection using Deep Convolutional Neural Network", Computer Vision and Pattern Recognition Workshops (CVPRW), Jun. 2018, IEEE, https://openaccess.thecvf.com/content_cvpr_2018_workshops/papers/w11/Jindal_Face_Template_Protection_CVPR_2018_paper.pdf.

Talreja, Veeru et al., "Zero-Shot Deep Hashing and Neural Network Based Error Correction for Face Template Protection", Computer Vision and Pattern Recognition (cs.CV), Aug. 2019, arxiv.org, https://arxiv.org/pdf/1908.02706.pdf.

Boddeti, Vishnu Naresh et al, "Secure Face Matching Using Fully Homomorphic Encryption", IEEE 9th International Conference on Biometrics Theory, Applications and Systems (BTAS), Oct. 2018, IEEE, http://hal.cse.msu.edu/assets/pdfs/papers/2018-btas-secure-face-matching.pdf.

* cited by examiner

REGISTRATION AND VERIFICATION OF BIOMETRIC MODALITIES USING ENCRYPTION TECHNIQUES IN A DEEP NEURAL NETWORK

PRIORITY CLAIM

This U.S. patent application claims priority under 35 U.S.C. § 119 to: India Application No. 202021000863, filed on Jan. 8, 2020. The entire contents of the aforementioned application are incorporated herein by reference.

TECHNICAL FIELD

The disclosure herein generally relates to biometric template protection, and, more particularly, to registration and verification of biometric modalities using encryption techniques in a deep neural network.

BACKGROUND

The term biometrics is defined as automated recognition of individuals based on their unique behavioral and biological characteristics. A typical biometric system obtains these unique behavioral and physical characteristics by acquiring the user's biometric trait (such as fingerprints, iris, face, voice, gait etc.) via a sensor. Acquired data is processed to extract the salient information (feature set). During enrollment phase, the extracted feature set is stored in the database as a template. During verification, similar process is carried, and the template generated during verification is attempted for match with template generated during enrollment. Further a matching score S is outputted indicating the similarity between the two templates. However, the above conventional approach has its own security limitation. For instance, the biometric templates are stored in an un-protected form on a server system. It is important to secure biometric templates because unlike credit cards and passwords which when compromised can be revoked and reissued, biometric data (template) is permanently associated with a user and cannot be replaced. If a biometric template is exposed once, it is lost forever. Further, a compromised biometric template can be misused for cross-matching across databases. Moreover, not only in case of an attack on the server system, there is a possibility of all the original biometric templates getting lost or stolen. Using such stolen information, an attacker can perform model inversion attacks to retrieve image corresponding to each biometric template with reasonable accuracy, and the stolen biometric templates can be used for cross application matching.

To overcome the above, conventionally attempts have been made to improve matching performance with high levels of security by use of deep convolution neural network models. However, such attempts have some of prominent security limitations such as deep convolution neural network CNN model used to map images (e.g., face) to binary codes (256 Bit/1024 Bit) is stored in an unprotected form on the server. Given this model and access to the stolen protected templates, the adversary can exploit the False Accept Rate (FAR) of the system. Secondly, once the server system is compromised all the users need to be re-enrolled again. Further, the above conventional approaches also have privacy limitations, for instance, it is easily possible to identify whether a particular user is enrolled in the system or not wherein an attacker has to simply provide an image (collected from the online social media) to the biometric system. If the authentication is successful, the user is enrolled. Moreover, during enrollment (training) phase, unprotected feature vectors of the user are used to train the deep CNN. If the system administrators collude, then they can use a model inversion attack to know about the users who enrolled in the biometric system, thus compromising both privacy and security.

SUMMARY

Embodiments of the present disclosure present technological improvements as solutions to one or more of the above-mentioned technical problems recognized by the inventors in conventional systems. For example, in one aspect, there is provided a processor implemented method for registration and verification of biometric modalities using encryption techniques in a deep neural network. The method comprises capturing a first image comprising a biometric modality of a user for enrollment; pre-processing the first captured image comprising the biometric modality to obtain a first set of augmented images; generating, via the one or more hardware processors, a feature vector for (a) each of the first set of augmented images and (b) the first captured image comprising the biometric modality of the user, and encrypting the generated feature vector thereof using a fully homomorphic encryption (FHE) technique; generating, via the FHE technique executed by the one or more hardware processors, an encrypted reduced dimensionality feature vector using (i) the encrypted feature vector for (a) each of the first set of augmented images and (b) the first captured image comprising the biometric modality of the user, and (ii) an encrypted Random Projection Matrix (RPM) being identified and assigned to the user; and mapping, via an encrypted deep neural network executed by the one or more hardware processors, the encrypted reduced dimensionality feature vector for (a) each of the first set of augmented images and (b) the first captured image comprising the biometric modality of the user with a corresponding randomly generated binary code assigned to the user, wherein during the mapping, one or more encrypted parameters of a mapping network model are learnt by the encrypted deep neural network, and wherein a key pair is generated that comprises a private key and a public key.

In an embodiment, size of an input layer (fc1_size) of the encrypted deep neural network is equal to size of the encrypted reduced dimensionality feature vector.

In an embodiment, size of an output layer of the encrypted deep neural network is based on number of bits comprised in each of a plurality of binary codes assigned to the user.

In an embodiment, the method further comprises storing, in a database comprised in the memory, (i) the encrypted RPM and (ii) the encrypted parameters of the mapping network model, and (iii) the corresponding randomly generated binary code in an encrypted form along with a unique label assigned to the user. In other words, cryptographic hash is performed on the corresponding randomly generated binary code and the cryptographic hash of randomly generated binary code is stored in the memory and then the corresponding (original) randomly generated binary code are discarded.

In an embodiment, the method further comprises capturing a second image comprising a biometric modality of the user for validating an identity of the user; pre-processing the captured second image comprising the biometric modality to obtain a second set of augmented images; generating, via the one or more hardware processors, a feature vector for (a) each of the second set of augmented images and (b) the second captured image comprising the biometric modality of the user; performing, by using the generated public key, the FHE on the feature vector for each of the second set of augmented images to obtain an encrypted feature vector for (a) each of the second set of augmented images and (b) the second captured image comprising the biometric modality of the user; generating an encrypted reduced dimensionality feature vector for (a) each of the second set of augmented images and (b) the second captured image comprising the biometric modality of the user based on (i) the encrypted feature vector for (a) each of the second set of augmented images and (b) the second captured image comprising the biometric modality of the user and (ii) the encrypted RPM assigned to the user during the enrollment; generating, via the encrypted deep neural network, a set of encrypted prediction based binary codes based on (i) the encrypted reduced dimensionality feature vector for (a) each of the second set of augmented images and (b) the second captured image comprising the biometric modality of the user and (ii) the one or more encrypted parameters learnt by the encrypted deep neural network; decrypting the set of encrypted prediction based binary codes by using the generated private key to obtain a set of decrypted binary codes; performing a cryptographic hash function on the set of decrypted binary codes to obtain a set of cryptographic hash of binary code and performing a comparison of each of the set of cryptographic hash of binary code with a corresponding cryptographic hash of the randomly generated binary code assigned to the user comprised in the memory; and validating the identity of the user based on the comparison.

In another aspect, there is provided a system for registration and verification of biometric modalities using encryption techniques in a deep neural network. The system comprises a memory storing instructions; one or more communication interfaces; and one or more hardware processors coupled to the memory via the one or more communication interfaces, wherein the one or more hardware processors are configured by the instructions to execute the (programmed) instructions in a Trusted Execution Environment (TEE) to: capture a first image comprising a biometric modality of a user for enrollment; pre-process the first captured image comprising the biometric modality to obtain a first set of augmented images; generate, via the one or more hardware processors, a feature vector for each of the first set of augmented images and encrypt the generated feature vector thereof using a fully homomorphic encryption (FHE) technique; generate, via the FHE technique executed by the one or more hardware processors, an encrypted reduced dimensionality feature vector using (i) the encrypted feature vector for (a) each of the first set of augmented images and (b) the first captured image comprising the biometric modality of the user and (ii) an encrypted Random Projection Matrix (RPM) being identified and assigned to the user; and map, via an encrypted deep neural network executed by the one or more hardware processors, the encrypted reduced dimensionality feature vector for (a) each of the first set of augmented images and (b) the first captured image comprising the biometric modality of the user with a corresponding randomly generated binary code assigned to the user, wherein during the mapping, one or more encrypted parameters of a mapping network model are learnt by the encrypted deep neural network, and wherein a key pair is generated that comprises a private key and a public key.

In an embodiment, size of an input layer (fc1_size) of the encrypted deep neural network is equal to size of the encrypted reduced dimensionality feature vector.

In an embodiment, size of an output layer of the encrypted deep neural network is based on number of bits comprised in each of a plurality of binary codes assigned to the user.

In an embodiment, the one or more hardware processors are further configured by the instructions to store, in a database comprised in the memory, (i) the encrypted RPM and (ii) the encrypted parameters of the mapping network model, and (iii) the corresponding randomly generated binary code in an encrypted form along with a unique label assigned to the user.

In an embodiment, the one or more hardware processors are further configured by the instructions to capture a second image comprising a biometric modality of the user for validating an identity of the user; pre-process the captured second image comprising the biometric modality to obtain a second set of augmented images; generate, via the one or more hardware processors, a feature vector for (a) each of the second set of augmented images and (b) the second captured image comprising the biometric modality of the user; perform, by using the generated public key, the FHE on the feature vector for (a) each of the second set of augmented images and (b) the second captured image comprising the biometric modality of the user to obtain an encrypted feature vector for (a) each of the second set of augmented images and (b) the second captured image comprising the biometric modality of the user; generate an encrypted reduced dimensionality feature vector for (a) each of the second set of augmented images and (b) the second captured image comprising the biometric modality of the user based on (i) the encrypted feature vector for (a) each of the second set of augmented images and (b) the second captured image comprising the biometric modality of the user and (ii) the encrypted RPM assigned to the user during the enrollment; generate, via the encrypted deep neural network, a set of encrypted prediction based binary codes based on (i) the encrypted reduced dimensionality feature vector for (or of) (a) each of the second set of augmented images and (b) the second captured image comprising the biometric modality of the user and (ii) the one or more encrypted parameters learnt by the encrypted deep neural network; decrypt the set of encrypted prediction based binary codes by using the generated private key to obtain a set of decrypted binary codes; perform a cryptographic hash function on the set of decrypted binary codes to obtain a set of cryptographic hash of binary code and perform a comparison of each of the set of cryptographic hash of binary code with a corresponding cryptographic hash of the randomly generated binary code assigned to the user comprised in the memory; and validate the identity of the user based on the comparison.

In yet another aspect, there are provided one or more non-transitory machine-readable information storage mediums comprising one or more instructions which when executed by one or more hardware processors in a Trusted Execution Environment (TTE) cause registration and verification of biometric modalities using encryption techniques in a deep neural network by capturing a first image comprising a biometric modality of a user for enrollment; pre-processing the first captured image comprising the biometric modality to obtain a first set of augmented images; generating, via the one or more hardware processors, a feature vector for (a) each of the first set of augmented images and (b) the first captured image comprising the biometric modality of the user and encrypting the generated feature vector thereof using a fully homomorphic encryption (FHE) technique; generating, via the FHE technique executed by the one or more hardware processors, an encrypted reduced dimensionality feature vector using (i)

the encrypted feature vector for (a) each of the first set of augmented images and (b) the first captured image comprising the biometric modality of the user and (ii) an encrypted Random Projection Matrix (RPM) being identified and assigned to the user; and mapping, via an encrypted deep neural network executed by the one or more hardware processors, the encrypted reduced dimensionality feature vector for (a) each of the first set of augmented images and (b) the first captured image comprising the biometric modality of the user with a corresponding randomly generated binary code assigned to the user, wherein during the mapping, one or more encrypted parameters of a mapping network model are learnt by the encrypted deep neural network, and wherein a key pair is generated that comprises a private key and a public key.

In an embodiment, size of an input layer (fc1_size) of the encrypted deep neural network is equal to size of the encrypted reduced dimensionality feature vector.

In an embodiment, size of an output layer of the encrypted deep neural network is based on number of bits comprised in each of a plurality of binary codes assigned to the user.

In an embodiment, the instructions when executed by the one or more hardware processors further cause storing, in a database comprised in the memory, (i) the encrypted RPM and (ii) the encrypted parameters of the mapping network model, and (iii) the corresponding randomly generated binary code in an encrypted form along with a unique label assigned to the user.

In an embodiment, the instructions when executed by the one or more hardware processors further cause capturing a second image comprising a biometric modality of the user for validating an identity of the user; pre-processing the captured second image comprising the biometric modality to obtain a second set of augmented images; generating, via the one or more hardware processors, a feature vector for (a) each of the second set of augmented images and (b) the second captured image comprising the biometric modality of the user; performing, by using the generated public key, the FHE on the feature vector for (a) each of the second set of augmented images and (b) the second captured image comprising the biometric modality of the user to obtain an encrypted feature vector for (a) each of the second set of augmented images and (b) the second captured image comprising the biometric modality of the user; generating an encrypted reduced dimensionality feature vector for (a) each of the second set of augmented images and (b) the second captured image comprising the biometric modality of the user based on (i) the encrypted feature vector for (a) each of the second set of augmented images and (b) the second captured image comprising the biometric modality of the user and (ii) the encrypted RPM assigned to the user during the enrollment; generating, via the encrypted deep neural network, a set of encrypted prediction based binary codes based on (i) the encrypted reduced dimensionality feature vector for (a) each of the second set of augmented images and (b) the second captured image comprising the biometric modality of the user and (ii) the one or more encrypted parameters learnt by the encrypted deep neural network; decrypting the set of encrypted prediction based binary codes by using the generated private key to obtain a set of decrypted binary codes; performing a cryptographic hash function on the set of decrypted binary codes to obtain a set of cryptographic hash of binary code and performing a comparison of each of the set of cryptographic hash of binary code with a corresponding cryptographic hash of the randomly generated binary code assigned to the user comprised in the memory; and validating the identity of the user based on the comparison.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
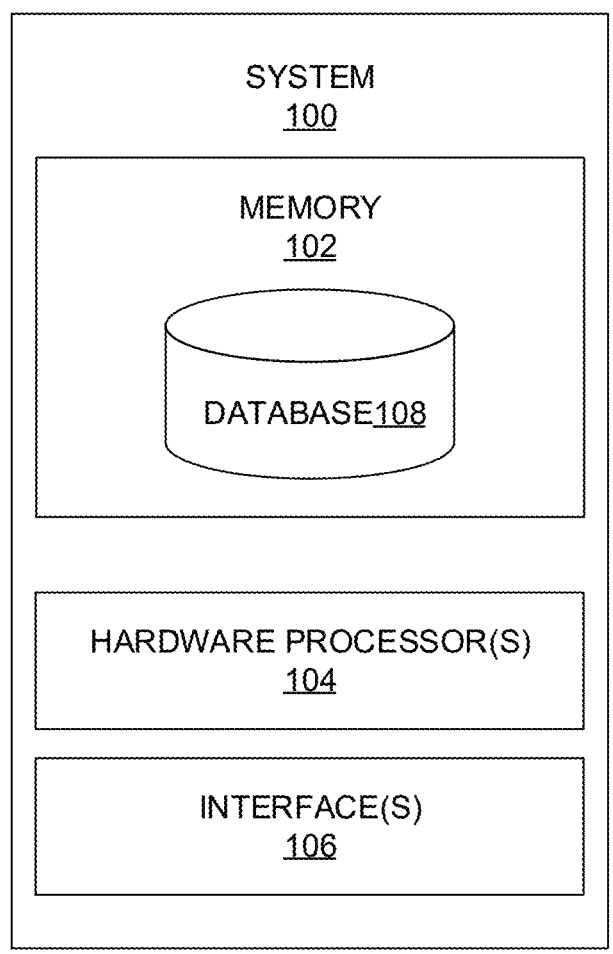
FIG. 1 depicts an exemplary block diagram of a system for registration and verification of biometric modalities using encryption techniques in an encrypted deep neural network, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

As mentioned above, conventionally attempts have been made to improve matching performance with high levels of security by use of deep convolution neural network models. However, such attempts have some of prominent security limitations such as the deep CNN model used to map images (e.g., face) to binary codes (256 Bit/1024 Bit) is stored in an unprotected form on the server. Given this model and access to the stolen protected templates, the adversary can exploit the False Accept Rate (FAR) of the system. Secondly, once the server system is compromised all the users need to be re-enrolled again. Further, the above conventional approaches have also privacy limitations such as it is easily possible to identify whether a particular user is enrolled in the system or not wherein an attacker has to simply provide an image (collected from the online social media) to the biometric system. If the authentication is successful, the user is enrolled. Moreover, during enrollment (training) phase, unprotected feature vectors of the user are used to train the deep CNN. If the system administrators collude, then they can use a model inversion attack to know about the users who enrolled in the biometric system, thus compromising both privacy and security. Conventional biometric registration and verification systems pose a challenge with respect to intra-user variability being caused due to variations in users pose in constrained environment (e.g., illumination, expression(s) and the like). Further, several known biometric verification systems utilize Partial Homomorphic Encryption with support for binarized data for encryption purposes. Such systems require quantification of feature vectors and this may lead to information loss due to lossy computations and thereby achieve degraded matching performance at the time of verification. Moreover, in conventional systems and approaches, feature vectors were stored on the server and matching was performed in the unprotected domain which pose, both security and privacy concern for registration and as well as verification process (refer above). Unlike conventional systems and approaches, present disclosure provides systems and methods that implement encrypted deep neural network(s) for mapping feature vectors to a randomly generated binary code. The deep neural network model learnt is encrypted.

More specifically, embodiments of the present disclosure herein provide method and system for biometric registration and verification (also referred as 'biometric modality registration and verification') in a secure manner using fully homomorphic encryption and encrypted neural network. For example, in various embodiments, the disclosed system utilizes homomorphic encryption computations for encrypting the feature vectors of the captured biometric template. As can be seen in the detailed description of various figures, the present disclosure acquires only 1 biometric type (e.g., one-shot enrollment) for registration/verification, where only one biometric image of the user is used for enrollment. Data augmentation is performed on segmented image set of the acquired biometric template (or biometric image of the user) to increase number of samples per user for enrollment since deep learning-based method requires lot of data for training. The increase in number of samples per user enables the system of the present disclosure to improve accuracy. Further, in the present disclosure the system performs dimensionality reduction of feature vector generated based on augmented images set, in the encrypted domain using fully homomorphic encryption. Additionally, system of the present disclosure an encrypted random projection matrix as a security feature, wherein random projection matrix is identified and assigned to each user during registration and fully homomorphic encryption is performed to obtain the encrypted random projection matrix.

Referring now to the drawings, and more particularly to FIG. 1 through 3B, where similar reference characters denote corresponding features consistently throughout the figures, there are shown preferred embodiments and these embodiments are described in the context of the following exemplary system and/or method.

FIG. 1 depicts an exemplary block diagram of a system for registration and verification of biometric modalities using encryption techniques in a deep neural network, in accordance with an embodiment of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises information, for example, biometric modalities (e.g., face image, iris (or retina), fingerprint (or palm print), and the like) of one or more user, segmented images pertaining to the biometric modalities captured via one or more sensors (e.g., image capturing device(s) or device(s) that are capable of capturing the biometric modalities of user), and the like. The database 108 may further comprise augmented images that are obtained by pre-processing the segmented images. The database 108 further comprises feature vector generated for each user, and encrypted feature vector associated thereof. The database 108 further comprises an encrypted reduced dimensionality feature vector specific to each user, encrypted Random Projection Matrix (RPM) being identified and assigned to the user, mapping information pertaining to the encrypted reduced dimensionality feature vector for each of the first set of augmented images being mapped with a corresponding randomly generated binary code assigned to the user, encrypted parameters of a mapping network model (that is generated and comprised in the memory 102) that are learnt by an encrypted deep neural network. The memory 102 may further store a key pair comprising a private key and a public key that is generated for each user. Similarly, the database 108 further stores encrypted prediction based binary codes and decrypted binary codes specific to each user. The database 108 further stores a set of cryptographic hash of binary code for each user, and information pertaining to validation of user(s). The memory 102 further comprises various technique(s) for performing registration and verification of users in the deep neural network wherein information is stored in a protected form (e.g., encrypted form). The various technique(s) include, but are not limited to, pre-processing technique(s) such as (a) segmentation technique(s), (b) augmentation technique(s) and the like. Other techniques that are stored in the memory 102 include for example, encryption technique(s) (e.g., such as fully homomorphic encryption (FHE) technique(s)), decryption technique(s), binary code generation technique(s), random projection matrix generation technique(s) and the like, which when invoked as appropriate perform corresponding operations for registration and verification of biometric modalities of users using in the encrypted deep neural network. In an embodiment, the present disclosure may utilize the above mentioned techniques as known in the art for performing methodologies described herein. The encrypted deep neural network refers to a deep neural network (DNN) wherein FHE is performed on the deep neural network and the FHE of DNN is comprised in the memory 102 and executed to perform methodology/methodologies described herein. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2A:
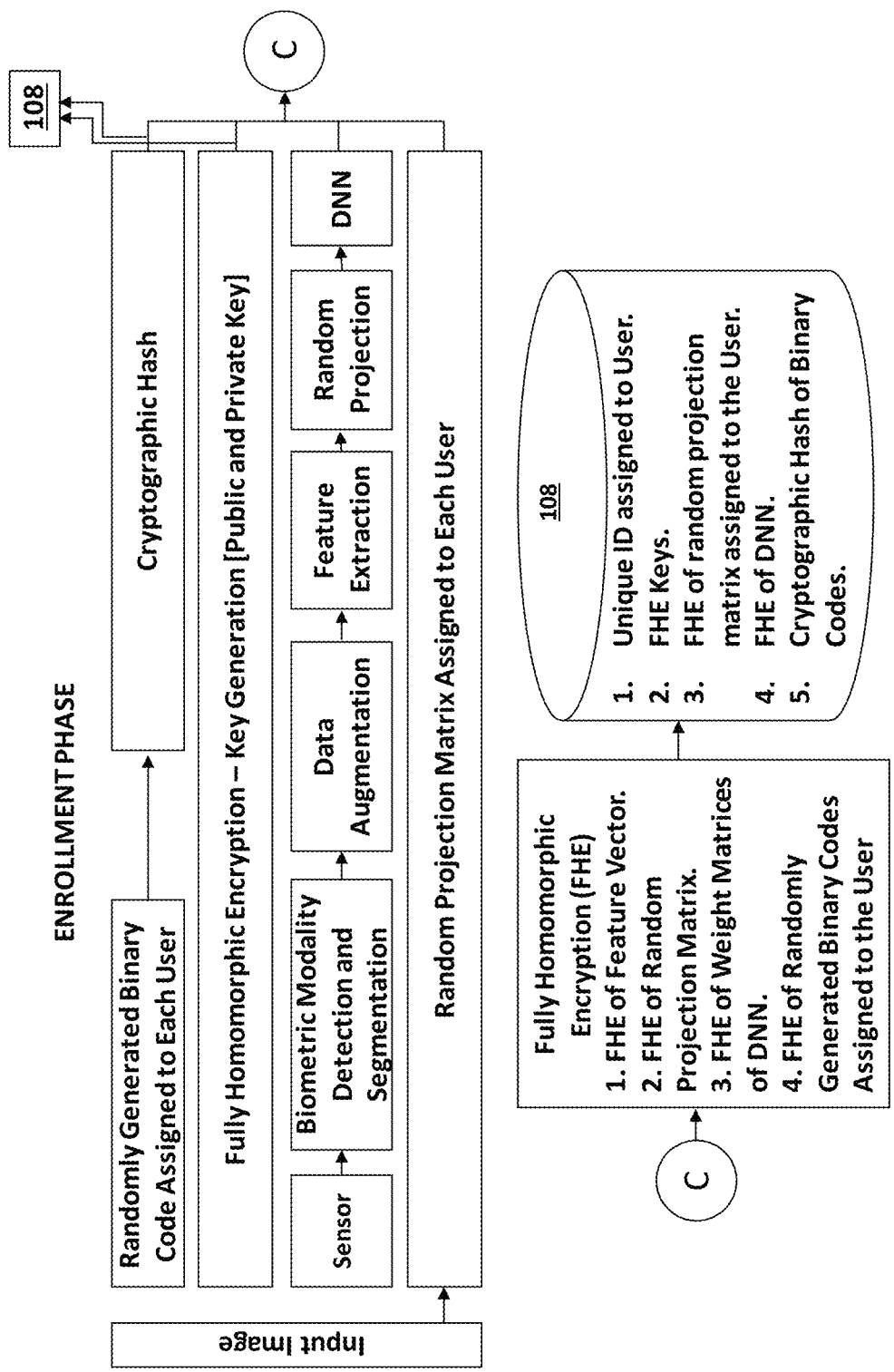
FIG. 2A depicts an exemplary functional block diagram for registration of biometric modalities of users using the encryption techniques in the (encrypted) deep neural network, in accordance with an embodiment of the present disclosure.
Figure 2B:
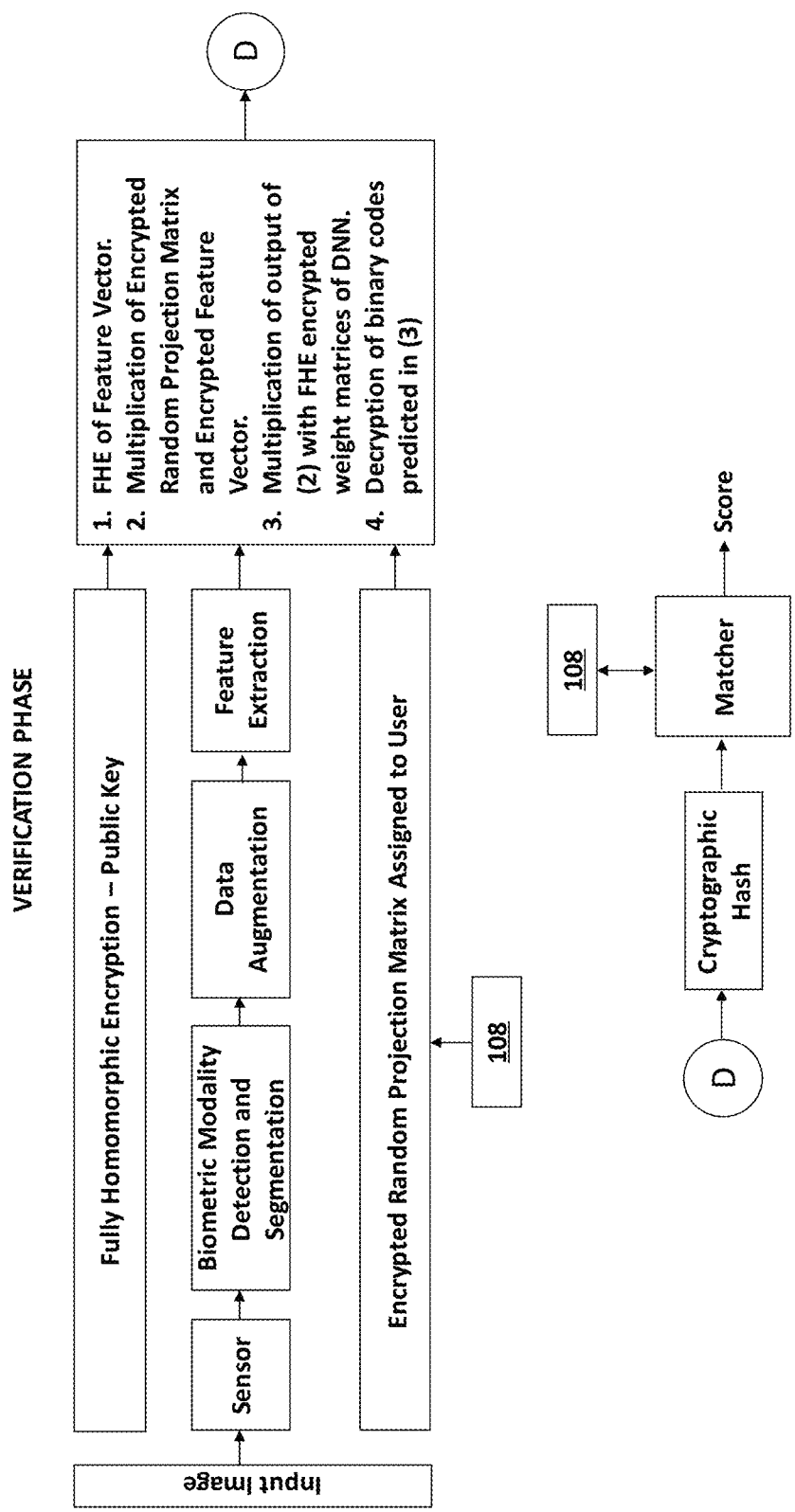
FIG. 2B depicts an exemplary functional block diagram for verification of biometric modalities of the users using the encryption techniques in the (encrypted) deep neural network, in accordance with an embodiment of the present disclosure.

FIGS. 2A-2B, with reference to FIG. 1, depicts an exemplary functional block diagram for registration and verification of biometric modalities of users using the encryption techniques in the deep neural network. More specifically, FIG. 2A depicts an exemplary functional block diagram for registration of biometric modalities of users using the encryption techniques in the (encrypted) deep neural network, in accordance with an embodiment of the present disclosure. FIG. 2B depicts an exemplary functional block diagram for verification of biometric modalities of the users using the encryption techniques in the (encrypted) deep neural network, in accordance with an embodiment of the present disclosure.

Figure 3A:
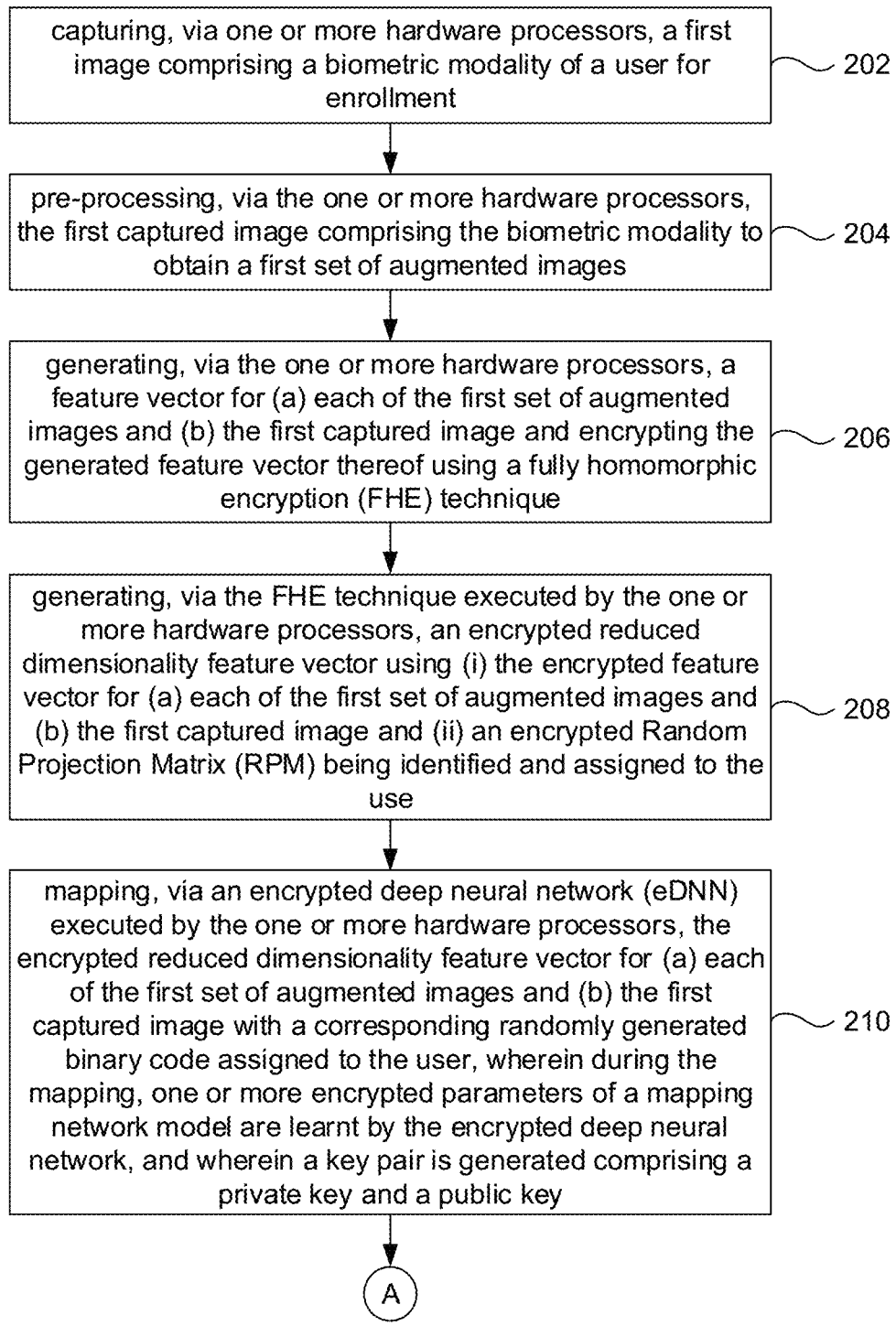
FIGS. 3A-3B depict an exemplary flow chart for registration and verification of biometric modalities of users using the encryption techniques in the encrypted deep neural network as implemented by the system of FIG. 1 and components depicted in FIGS. 2A-2B, in accordance with an embodiment of the present disclosure.
Figure 3B:
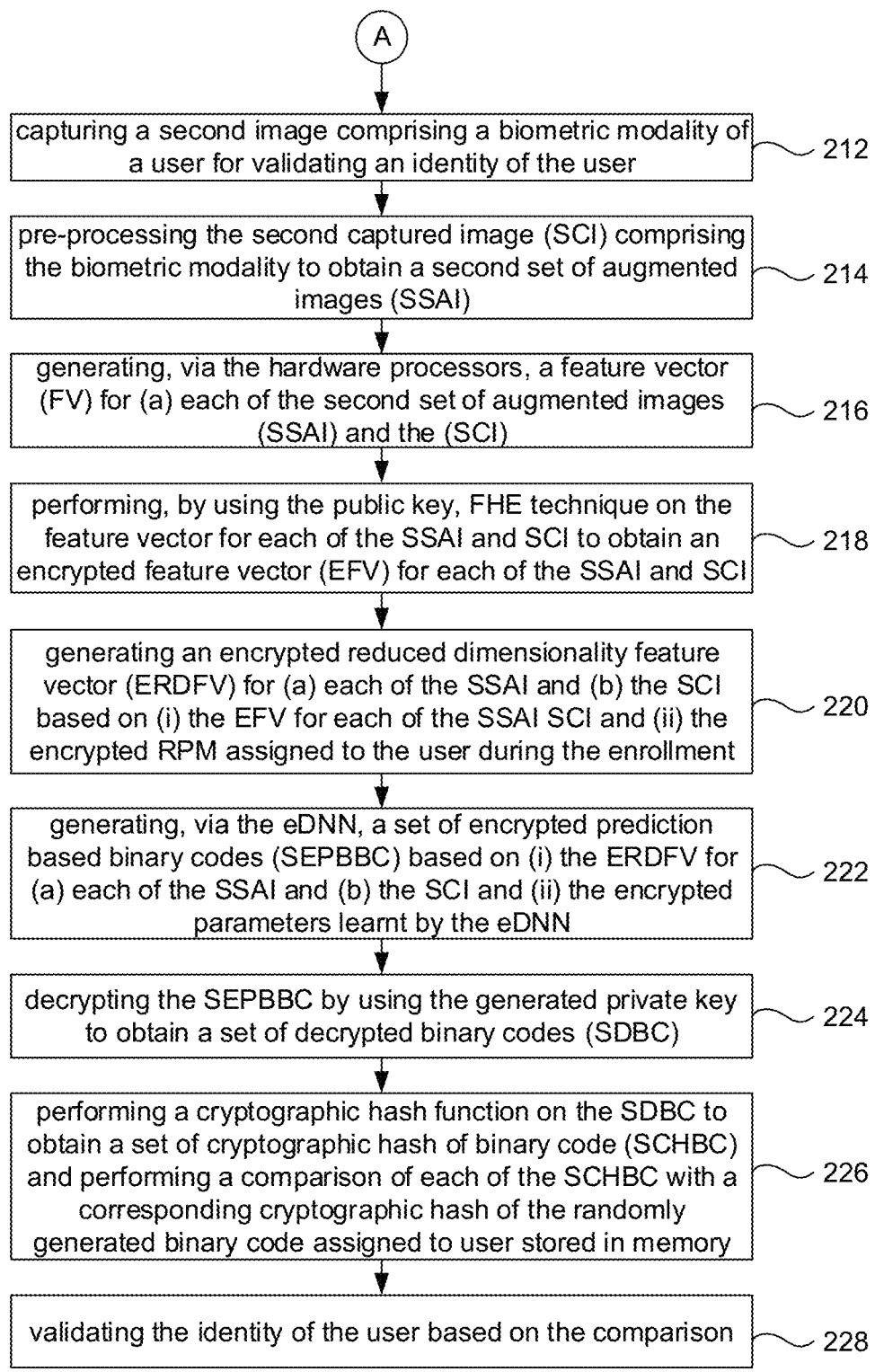

FIGS. 3A-3B, with reference to FIGS. 1-2B, depicts an exemplary flow chart for registration and verification of biometric modalities of users using the encryption techniques in the deep neural network as implemented by the system 100 of FIG. 1 and components depicted in FIGS. 2A-2B, in accordance with an embodiment of the present disclosure. In an embodiment, the system(s) 100 comprises one or more data storage devices or the memory 102 operatively coupled to the one or more hardware processors 104 and is configured to store instructions (also referred as programmed instructions) for execution of steps of the method by the one or more processors 104 in a trusted execution environment (TEE). The steps of the method of the present disclosure will now be explained with reference to components of the system 100 of FIG. 1 and FIGS. 2A-2B, and the flow diagram as depicted in FIGS. 3A-3B. At step 202 of the present disclosure, a first image comprising a biometric modality of a user is obtained. For instance, the first image comprising the biometric modality (e.g., a face image or an iris, or fingerprint(s) and the like) may be captured through an image capturing device (or sensor) attached (e.g., either internally configured, or externally attached via available communication interface(s)) to the system 100. The image capturing device may also be referred as biometric modality capturing device or sensing device that is configured to capture biometric modality (or modalities) of various users for enrollment and verification thereof. For instance, an image (e.g., the first image) captured at the sensor is of jpeg type (e.g., say abc.jpeg). For better understanding of the embodiments of the present disclosure, face image of a user (e.g., say John Doe) is considered and the same is captured during the enrollment and verification process. Assuming the captured image is a face image (e.g., the first image being the face image of a specific user) has width of 640 pixels and height of 480 pixels. In the present disclosure, the systems and methods are implemented wherein only a single high-resolution image of the biometric modality is captured at the sensor. This one-shot enrollment (where only 1 image of the user is used for enrollment process) makes the entire biometric system user friendly.

Upon obtaining the first captured image, at step 204 of the present disclosure, the one or more hardware processors 104 pre-process the first captured image comprising the biometric modality to obtain a first set of augmented images. The step of pre-processing as described herein includes segmenting the first captured image to obtain a plurality of sub-images; and augmenting each of the plurality of sub-images by applying a plurality of image processing techniques (e.g., image processing technique(s) as known in the art) to obtain the first set of augmented images. In other words, the captured jpeg image (say face image of the user John Doe) is subjected to a face detection algorithm, wherein the detected face is extracted and resized to a 160*160 image. Each 160*160 face image is subjected to data augmentation process to generate 'm' augmented images (e.g., 6 augmented images), of size 160*160 pixels. The segmented images undergo augmentation corresponding to one or more operations for example, but are not limited to, zoom, horizontal shift, vertical shift, horizontal flip, rotation, brightness adjustment and the like. More specifically, the segmented image (also referred as sub-image of the captured image post segmentation and may be interchangeably used hereinafter) can be randomly zoomed in within a certain pre-defined range (e.g., zoom range may include [0.5, 1.5]). Similarly, positive and negative horizontal shifts may be randomly selected within a certain pre-defined range (e.g., positive negative horizontal shift range may include [−10, 10]) and the pixel values at the end of the image are duplicated to fill in empty part of the image created by the shift. Similarly, the segmented image may undergo vertical shift operation wherein positive and negative vertical shifts are randomly selected within a certain pre-defined range (e.g., positive negative vertical shift range may include [−0.5, 0.5]). Further other operation of augmentation may include such as applying horizontal flip to the biometric image (segmented image or captured image). Alternatively, image may be rotated clockwise (or anti-clockwise) within the certain pre-defined rotation range argument. Moreover, brightness adjustment (darkening and brightening) may be carried out within a certain pre-defined range depending on the image (e.g., first image) being captured in a given environment (e.g., constrained environment or controlled environment). Post augmentation, all possible 157*157 crops of each 160*160 image are taken. Each 157*157 cropped image is then resized to 160*160. Thus, total number of augmented images in 7*(160−157+1)*(160−157+1).

At step 206 of the present disclosure, the hardware processors 104 generates a feature vector for (a) each of the first set of augmented images and (b) the first captured image comprising the biometric modality of the user and performs encryption thereof to obtain an encrypted feature vector for (a) each of the first set of augmented images and (b) the first captured image comprising the biometric modality of the user. In an embodiment, the present disclosure may utilize a pre-trained model (comprised in the system 100) which when executed by the one or more hardware processors 104 generate the feature vector. In another embodiment, the present disclosure may utilize standard feature descriptors (comprised in the system 100) which when executed by the one or more hardware processors 104 generate the feature vector. In the experiments conducted by the present disclosure, each of the 7*(160−157+1)*(160−157+1) 160*160 face image was fed into the system 100 (or a pre-trained feature extraction model/or the pre-trained model) for faces. A 128 dimensional feature vector corresponding to each of the 7*(160−157+1)*(160−157+1) face images was outputted by the system 100 and the same 128 dimensional feature vector was encrypted using the fully homomorphic encryption (FHE) technique stored in the memory 102 to output an encrypted feature vector thereof for (a) each of the first set of augmented images and (b) the first captured image comprising the biometric modality of the user.

At step 208 of the present disclosure, the FHE technique (executed by the one or more hardware processors 104) generates an encrypted reduced dimensionality feature vector using (i) the encrypted feature vector for (a) each of the first set of augmented images and (b) the first captured image comprising the biometric modality of the user and (ii) an encrypted Random Projection Matrix (RPM) being identified and assigned to the user. In other words, the encrypted feature vector generated for (a) each of the first set of augmented images and (b) the first captured image comprising the biometric modality of the user is used for generation of encrypted reduced dimensionality feature vector along with the encrypted Random Projection Matrix (RPM). Each user who is being enrolled is assigned a Random Projection Matrix (RPM). RPM of dimension 'k*d' was used by embodiments of the present disclosure during experiments to project the original 'd' dimensional data to a 'k' dimensional (k<<d) subspace through the origin, wherein value of d and k were chosen as 128 and 96 respectively (e.g., d=128 and k=96). More specifically, in the present disclosure, the RPM is identified and encrypted and then is multiplied with the generated feature vector to get the reduced dimensionality feature vector in an encrypted form using FHE technique. Assigning the RPM to each user during enrollment: (i) enables reducing the dimensionality of the feature vector, since the feature vector is encrypted using Fully Homomorphic Encryption (FHE) which is computationally intensive, therefore dimensionality reduction is of prime importance and (ii) acts as cancellable transform and thus provides an additional security layer. In case the user's encrypted feature vector stored on the server database is compromised, the new keys (using the key generation) and a new random projection matrix can be generated for each user. It is to be understood by a person having ordinary skill in the art or person skilled in the art that though the present disclosure utilizes multiplication operation for multiplying each of the 7*(160−157+1)*(160−157+1) encrypted feature vectors with the encrypted random projection matrix assigned to the user, such multiplication operation shall not be construed as limiting the scope of the present disclosure and the systems and methods of the present disclosure may perform any other logical operation to obtain (or output) encrypted reduced dimensionality feature vectors. It is to be further understood by a person having ordinary skill in the art or person skilled in the art that assignment of random projection matrix is independent of the user and the biometric modality captured thereof.

At step 210 of the present disclosure, an encrypted deep neural network executed by the one or more hardware processors 104 maps the encrypted reduced dimensionality feature vector for (a) each of the first set of augmented images and (b) the first captured image comprising the biometric modality of the user with a corresponding randomly generated binary code assigned to the user. In other words, the encrypted reduced dimensionality feature vector of (a) each of the first set of augmented images and (b) the first captured image comprising the biometric modality of the user is mapped with a corresponding randomly generated binary code assigned to the user. Each user who is being enrolled is assigned a 'n' bit binary code (e.g., say 64-bit binary code), wherein each bit of the binary code is generated randomly by the binary code generation technique(s) comprised in the memory. It is to be further understood by a person having ordinary skill in the art or person skilled in the art that generation of binary code(s) and assignment thereof to corresponding user(s) is independent of the user and the biometric modality captured thereof. During the mapping, one or more encrypted parameters of a mapping network model are learnt by the encrypted deep neural network. In an embodiment, size of an input layer (fc1_size) of the encrypted deep neural network is equal to size of the encrypted reduced dimensionality feature vector. In the present disclosure, the size of the input layer is 96. In an embodiment, size of an output layer of the encrypted deep neural network is based on number of bits comprised in each of a plurality of binary codes assigned to the user. In other words, the size of the output layer (represented by K) is the number of bits in the randomly generated binary codes assigned to each user. In the present disclosure, the size of the output layer is 64. Further, size of a first fully connected hidden input layer (fc2_size) of the encrypted deep neural network is one of (i) less than, (ii) greater than or (iii) equal to size of an input layer (fc1_size) of the deep neural network. In the present disclosure, the size of the first fully connected hidden layer (represented by fc2_size) is 88. Furthermore, size of a second fully connected hidden input layer (fc3_size) of the encrypted deep neural network is one of (i) less than, (ii) greater than or (iii) equal to size of the first fully connected hidden input layer (fc2_size) of the encrypted deep neural network. In the present disclosure, size of the fully connected hidden layer (represented by fc3_size) is 80. It is to be understood by a person having ordinary skill in the art or person skilled in the art that the size of (i) the input layer, (ii) the first fully connected hidden input layer, (iii) the second fully connected hidden input layer and (iv) the output layer of the encrypted deep neural network may vary according to (i) the biometric modality of user being captured and processed and/or (ii) configuration of the encrypted neural network based on implementation requirement. It is to be further understood by a person having ordinary skill in the art or person skilled in the art that the size of the above layers and the encrypted deep neural network shall not be construed as limiting the scope of the embodiments of the present disclosure. In an embodiment of the present disclosure, the one or more encrypted parameters of the mapping network model of the encrypted deep neural network comprise but are not limited to, polynomial approximation of Rectified Linear Unit activation function(s) used in fc2 and fc3 layers, polynomial approximation of sigmoid activation function used in fc4 layer, no dropout used in any of these fully connected layers and the like. The encrypted parameters may vary depending on the implementation requirement/configuration of the encrypted deep neural network and shall not be construed as limiting the scope of the embodiments of the present disclosure.

A key pair comprising a private key and a public key is generated by the system 100 (also referred as a server system) for each user during enrollment. This is used for protecting the data on a server database (e.g., the database 108). The key pair (the private key and public key also referred as 'THE keys' and interchangeably used herein) is stored in the system 100. One or more FHE parameters such as number of values that can be packed, plaintext modulus, ciphertext modulus and the like are set to create keys (e.g., the private key and public key as mentioned above). In an embodiment of the present disclosure, the public key is used to encrypt (by executing Fully Homomorphic Encryption (FHE) technique)) (i) each of the 128 dimensional feature vector corresponding to each image of dimension 160*160, (ii) the Random Projection Matrix (RPM) assigned to the user, (ii) weight matrices (or the one or more encrypted parameters) learnt by the encrypted deep neural network, and (iv) the randomly generated binary codes assigned to each user during enrollment.

Post performing mapping as described in step 210, (i) the encrypted RPM and (ii) the encrypted parameters of the mapping network model, and (iii) the corresponding randomly generated binary code in an encrypted form along with a unique label assigned to the user are stored in the database 108 comprised in the memory 102. In other words, cryptographic hash is performed on the corresponding randomly generated binary code and the cryptographic hash of randomly generated binary code is stored in the memory and then the corresponding (original) randomly generated binary code are discarded. More specifically, deletion of corresponding (original) randomly generated binary code is performed and only the cryptographic hash of randomly generated binary code is stored in the memory for enhanced security of the system 100 to avert or refrain from attack(s)/theft. Further post performing mapping, the one or more hardware processors 104 perform cryptographic hash function (or operation) on the randomly generated binary code to obtain cryptographic hash of the randomly generated binary code. In the present disclosure, namely, cryptographic hash function SHA3-512 is implemented and such implementation shall not be construed as limiting the scope of the present disclosure.

Post performing mapping (210) and performing cryptographic hash function (or operation) on the randomly generated binary code, the system 100 performs validation, wherein an identity of the user is validated during a verification process. The verification process includes a series of steps implemented/executed by the one or more hardware processors 104 that also executes one or more technique(s) to perform verification/validation of the identity of the user. The verification/validation steps are illustrated by way of example below:

For instance, in an embodiment, at step 212 of the present disclosure, a second image comprising a biometric modality of the user (e.g., face image of the user 'John Doe') is obtained for validating the identity of the user. For example, say image captured at the sensor is of jpeg type. The captured image has width of 640 pixels and height of 480 pixels. Only a single high-resolution image of the biometric modality is captured at the sensor. Further, the captured second image comprising the biometric modality is pre-processed to obtain a second set of augmented images. As mentioned above the pre-processing and augmentation steps are repeated and are performed in a similar manner and the same are depicted in step 214 of FIG. 3B of the present disclosure. For instance, each 160*160 face image is subjected to data augmentation process to generate 'x' augmented images (e.g., 6 augmented image), of size 160*160, corresponding to each operation namely zoom, horizontal shift, vertical shift, horizontal flip, rotation and brightness adjustment. Thereafter all possible 157*157 crops of each 160*160 image are taken. Each 157*157 cropped image is then resized to 160*160. Thus, total number of augmented images is 7*(160−157+1)*(160−157+1).

Further, in an embodiment, at step 216 of the present disclosure, a feature vector for (a) each of the second set of augmented images and (b) the second captured image comprising the biometric modality of the user, is generated via the one or more hardware processors 104. As discussed above, in an embodiment, the present disclosure may utilize a pre-trained model (comprised in the system 100) which when executed by the one or more hardware processors 104 generate the feature vector. In another embodiment, the present disclosure may utilize standard feature descriptor(s) as known in the art (comprised in the system 100) which when executed by the one or more hardware processors 104 generate the feature vector. For instance, each of the 7*(160−157+1)*(160−157+1) 160*160 face image is fed into the system (wherein a pre-trained feature extraction model or standard feature descriptor(s) comprised in the memory 102 may be executed and utilized as applicable) for faces. A 128-dimensional feature vector corresponding to each of the 7*(160−157+1)*(160−157+1) face images was outputted by the system 100. Thereafter, at step 218 of the present disclosure, the FHE technique is applied on the feature vector for (a) each of the second set of augmented images and (b) the second captured image comprising the biometric modality of the user wherein fully homomorphic encryption is performed, via the encrypted deep neural network, to obtain an encrypted feature vector for (a) each of the second set of augmented images and (b) the second captured image comprising the biometric modality of the user. For example, the hardware processors 104 utilize the generated public key as described above in the mapping step 210 to encrypt (perform Fully Homomorphic Encryption on) each of the 128-dimensional feature vectors. Total number of encrypted feature vectors obtained for the second set of augmented images and the second captured image are: 7*(160−157+1)*(160−157+1).

Further, at step 220 of the present disclosure, the system 100 (or the encrypted deep neural network executed by the one or more hardware processors 104) generates an encrypted reduced dimensionality feature vector for (a) each of the second set of augmented images and (b) the second captured image comprising the biometric modality of the user based on (i) the encrypted feature vector for (a) each of the second set of augmented images and (b) the second captured image comprising the biometric modality of the user and (ii) the encrypted RPM assigned to the user during the enrollment. For example, each of the 7*(160−157+1)*(160−157+1) encrypted feature vectors is multiplied with the encrypted random projection matrix assigned to the user (during enrollment phase) stored in the database 108. This results in 7*(160−157+1)*(160−157+1) encrypted reduced dimensionality feature vectors. It is to be understood by a person having ordinary skill in the art or person skilled in the art that though the present disclosure utilizes multiplication operation for multiplying each of the 7*(160−157+1)*(160−157+1) encrypted feature vectors with the encrypted random projection matrix assigned to the user, such multiplication operation shall not be construed as limiting the scope of the present disclosure and the systems and methods of the present disclosure may perform any other logical operation to obtain (or output) encrypted reduced dimensionality feature vectors. It is to be further understood that assignment of random projection matrix is independent of the user and the biometric modality captured thereof.

Further, at step 222 of the present disclosure, the encrypted deep neural network of the system 100 generates a set of encrypted prediction based binary codes based on (i) the encrypted reduced dimensionality feature vector for (a)

each of the second set of augmented images and (b) the second captured image comprising the biometric modality of the user, and (ii) the one or more encrypted parameters learnt by the deep neural network. In other words, each of the 7*(160−157+1)*(160−157+1) encrypted reduced dimensionality feature vectors are given as input to the deep neural network trained during the enrollment phase, wherein each of the 7*(160−157+1)*(160−157+1) reduced dimensionality encrypted feature vectors is multiplied (fully homomorphic encryption) with the encrypted weight matrices (obtained during training phase) of fully connected layers namely fc2, fc3 and fc4 layers respectively. The output of fc4 layer is subjected to the polynomial approximation of the sigmoid activation function to obtain an encrypted prediction of the binary codes (also referred as 'set of encrypted prediction based binary codes' as mentioned above and may be interchangeably used hereinafter).

Further, at step 224 of the present disclosure, the encrypted deep neural network of the system 100 decrypts the set of encrypted prediction based binary codes by using the generated private key to obtain a set of decrypted binary codes. In other words, each of the 7*(160−157+1)*(160−157+1) encrypted predictions of the binary codes are decrypted using the generated private key and by executing a decryption technique (comprised in the memory 102) to obtain the predicted binary code (also referred as 'set of decrypted binary codes' as mentioned above and may be interchangeably used hereinafter).

At step 226 of the present disclosure, the system 100 (or the encrypted deep neural network executed by the one or more hardware processors 104) performs a cryptographic hash function on the set of decrypted binary codes to obtain a set of cryptographic hash of binary code and a comparison of each of the set of cryptographic hash of binary code is performed with a corresponding cryptographic hash of the randomly generated binary code assigned to the user comprised in the memory 102. In other words, each of the 7*(160−157+1)*(160−157+1) predicted binary codes are subjected to a cryptographic hash function and each of the 7*(160−157+1)*(160−157+1) cryptographic hash is compared with a corresponding cryptographic hash of the binary code stored against the user identity label in the database 108 comprised in the memory.

Based on the comparison output, at step 228 of the present disclosure, identity of the user (e.g., John Doe) is validated thereby achieving successful verification, via the encrypted deep neural network of the system 100. For instance, number of matches of each of the 7*(160−157+1)*(160−157+1) cryptographic hash is compared with a corresponding cryptographic hash of the binary code is estimated (or determined) and if the match count is equal to or greater than a pre-defined threshold 'y' then the user's identity is verified as successful validation, else the user verification is outputted as unsuccessful validation. For example, assuming the number of matches obtained from comparison is 'm' (e.g., 'm=7'—wherein 7 cryptographic hash of binary code obtained during the verification process match with 7 corresponding cryptographic hash of the binary code stored in the memory 102 during the enrollment process or during training of the encrypted deep neural network) and the pre-defined threshold (e.g., say 'y' threshold is 5). In this case, value of 'm' is greater than 'y' and hence the user is verified. In an embodiment of the present disclosure, the value of pre-defined threshold 'y' is configurable to another value based on implementation of present disclosure and its systems and methods. Further, the value of pre-defined threshold 'y' may be set to one single value for all users. For instance, the pre-defined threshold 'y' say may have a value of 5 for all users who enroll and are further verified at a later stage. In such scenarios, a minimum of 5 cryptographic hash of binary code obtained during the verification process should match with 5 corresponding cryptographic hash of the binary code stored in the memory 102 during the enrollment process or during training of the encrypted deep neural network.

In another embodiment, value of the pre-defined threshold 'y' say may vary from user to user for comparison and (minimum) number of matches to be obtained for each user for successful validation. For instance, the pre-defined threshold 'y' may be set with a value of 5 for user 1 and the pre-defined threshold 'y' may be set with a value of 6 for user 2. In such scenarios, for user 1, at least 5 comparisons between (i) cryptographic hash of binary code obtained during verification process and (ii) corresponding cryptographic hash of the binary code comprised in the memory 102 should result in a match for successful validation/verification of user 1 identity. Similarly, for user 2, at least 6 comparisons between (i) cryptographic hash of binary code obtained during verification process and (ii) corresponding cryptographic hash of the binary code comprised in the memory 102 should result in a match for successful validation/verification of user 1 identity. The above example of comparison and matching is carried by a matcher comprised in the memory 102 which takes necessary data from the database 108 for comparison and matching and the same is depicted in FIG. 2B. The score as depicted in FIG. 2B can be represented as number of matches obtained during comparison as described above by way of non-construing example scenarios. In the above examples, the number of matches may indicate a score which is compared with the pre-defined threshold (y).

Herein, the hardware processors 104 (or the system 100 or the encrypted neural network comprised in the system 100 and when executed) execute the programmed instructions (described with reference to FIGS. 1-3B) for the biometric registration and verification in the Trusted Execution Environment (TEE). A TEE is a secured area within a main processor of a system (e.g., the system 100) of the present disclosure. In various embodiments, the TEE may run in parallel of the operating system, in an isolated environment. The TEE ensures that execution by the hardware processors 104 by via of incoming data (e.g., input image or data loaded) in the TEE are protected with respect to the confidentiality and integrity.

The TEE's ability to offer safe execution of authorized security software, known as 'trusted applications' (TAs), enables it to provide end-to-end security by protecting the execution of authenticated code, confidentiality, authenticity, privacy, system integrity and data access rights. Comparative to other security environments as is scenario in conventional systems wherein incoming data is processed in an unprotected form thus leading to prominent security limitations as discussed above such as mapping information of images to binary codes being stored in an unprotected form, the TEE as implemented by the embodiments of the present disclosure also offers high processing speeds and a large amount of accessible memory. The primary purpose of the isolated execution environment, provided by the TEE, is to protect system and TA assets. Herein, the memory devices or the memory 102 may offer TEE storage for storing the programmed instructions and data pertaining to the biometric registration and verification of biometric modality (or modalities) of corresponding user(s).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:

capturing, via one or more hardware processors, a first image comprising a biometric modality of a user for enrollment;

pre-processing, via the one or more hardware processors, the first captured image comprising the biometric modality to obtain a first set of augmented images;

generating, via the one or more hardware processors, a feature vector for (a) each of the first set of augmented images and (b) the first captured image comprising the biometric modality of the user, and encrypting the generated feature vector thereof using a fully homomorphic encryption (FHE) technique;

generating, via the FHE technique executed by the one or more hardware processors, an encrypted reduced dimensionality feature vector using (i) the encrypted feature vector for (a) each of the first set of augmented images and (b) the first captured image comprising the biometric modality of the user, and (ii) an encrypted Random Projection Matrix (RPM) being identified and assigned to the user, wherein the RPM is of dimension "k*d" to project an original "d" dimensional data to a "k" dimensional subspace through origin, wherein value of "k" is chosen less than value of "d", and wherein the assignment of the RPM is independent of the user and the biometric modality of the user; and mapping, via an encrypted deep neural network executed by the one or more hardware processors, the encrypted reduced dimensionality feature vector for (a) each of the first set of augmented images and (b) the first captured image comprising the biometric modality of the user with a corresponding randomly generated binary code assigned to the user, wherein during the mapping, one or more encrypted parameters of a mapping network model are learnt by the encrypted deep neural network, wherein a key pair is generated, the key pair comprising a private key and a public key, wherein a cryptographic hash function is performed on the corresponding randomly generated binary code to obtain a cryptographic hash of the corresponding randomly generated binary code that is comprised in a memory, wherein each of a set of corresponding hash of binary code generated during verification of an identity of the user is compared with a cryptographic hash of the corresponding randomly generated binary code and a number of matches is estimated based on the comparison, wherein the user's identification is successfully verified if the number of matches is equal to or greater than a pre-defined threshold, wherein value of the pre-defined threshold varies from a first user to a second user for comparison and the number of matches to be obtained for each user for successful verification, and wherein a number of comparisons, between each of the set of cryptographic hash of binary code obtained during the verification and the corresponding cryptographic hash of the corresponding randomly generated binary code comprised in the memory, for the first user and the second user, respectively, depending on the value of respective pre-defined threshold set for the first user and the second user, results in a match for the successful verification of respective identities of the first user and the second user.

2. The processor implemented method as claimed in claim 1, wherein size of an input layer (fc1_size) of the encrypted deep neural network is equal to size of the encrypted reduced dimensionality feature vector.

3. The processor implemented method as claimed in claim 1, wherein size of an output layer of the deep neural network is based on number of bits comprised in each of a plurality of binary codes assigned to the user.

4. The processor implemented method as claimed in claim 1, wherein (i) the encrypted RPM and (ii) the one or more encrypted parameters of the mapping network model, and (iii) the corresponding randomly generated binary code in an encrypted form along with a unique label assigned to the user are stored in a database comprised in the memory.

5. The processor implemented method as claimed in claim 1, further comprising:

capturing a second image comprising a biometric modality of the user for validating an identity of the user;

pre-processing the captured second image comprising the biometric modality to obtain a second set of augmented images;

generating, via the one or more hardware processors, a feature vector for (i) each of the second set of augmented images and (ii) the second captured image comprising the biometric modality of the user;

performing, by using the generated public key, the FHE technique on the feature vector for (i) each of the second set of augmented images and (ii) the second captured image comprising the biometric modality of the user to obtain an encrypted feature vector for (a) each of the second set of augmented images and (b) the second captured image comprising the biometric modality of the user;

generating an encrypted reduced dimensionality feature vector for (a) each of the second set of augmented images and (b) the second captured image comprising the biometric modality of the user based on (i) the encrypted feature vector for (a) each of the second set of augmented images and (b) the second captured image comprising the biometric modality of the user and (ii) the encrypted RPM assigned to the user during the enrollment;

generating, via the encrypted deep neural network, a set of encrypted prediction based binary codes based on (i) the encrypted reduced dimensionality feature vector for (a) each of the second set of augmented images and (b) the second captured image comprising the biometric modality of the user and (ii) the one or more encrypted parameters learnt by the deep neural network;

decrypting, via the encrypted deep neural network, the set of encrypted prediction based binary codes by using the generated private key to obtain a set of decrypted binary codes;

performing, via the encrypted deep neural network, the cryptographic hash function on the set of decrypted binary codes to obtain the set of cryptographic hash of binary code and performing a comparison of each of the set of cryptographic hash of binary code with the corresponding cryptographic hash of the randomly generated binary code assigned to the user comprised in the memory; and validating, via the encrypted deep neural network, the identity of the user based on the comparison.

6. A system, comprising:

a memory storing instructions;

one or more communication interfaces; and one or more hardware processors coupled to the memory via the one or more communication interfaces, wherein the one or more hardware processors are configured by the instructions in a trusted execution environment (TEE) to:

capture a first image comprising a biometric modality of a user for enrollment; pre-process the first captured image comprising the biometric modality to obtain a first set of augmented images;

generate, via the one or more hardware processors, a feature vector for (a) each of the first set of augmented images and (b) the first captured image comprising the biometric modality of the user, and encrypt the generated feature vector thereof using a fully homomorphic encryption (FHE) technique;

generate, via the FHE technique executed by the one or more hardware processors, an encrypted reduced dimensionality feature vector using (i) the encrypted feature vector for (a) each of the first set of augmented images and (b) the first captured image comprising the biometric modality of the user, and (ii) an encrypted Random Projection Matrix (RPM) being identified and assigned to the user, wherein the RPM is of dimension "k*d" to project an original "d" dimensional data to a "k" dimensional subspace through origin, wherein value of "k" is chosen less than value of "d", and wherein the assignment of the RPM is independent of the user and the biometric modality of the user; and map, via an encrypted deep neural network executed by the one or more hardware processors, the encrypted reduced dimensionality feature vector for (a) each of the first set of augmented images and (b) the first captured image comprising the biometric modality of the user with a corresponding randomly generated binary code assigned to the user, wherein during the mapping, one or more encrypted parameters of a mapping network model are learnt by the deep neural network, wherein a key pair is generated, the key pair comprising a private key and a public key, wherein a cryptographic hash function is performed on the corresponding randomly generated binary code to obtain a cryptographic hash of the corresponding randomly generated binary code that is stored in a memory, wherein each of a set of corresponding hash of binary code generated during verification of an identity of the user is compared with a cryptographic hash of the corresponding randomly generated binary code and a number of matches is estimated based on the comparison, wherein the user's identification is successfully verified if the number of matches is equal to or greater than a pre-defined threshold, wherein value of the pre-defined threshold varies from user to user for comparison and the number of matches to be obtained for each user for successful verification, and wherein a number of comparisons, between each of the set of cryptographic hash of binary code obtained during the verification and the corresponding cryptographic hash of the corresponding randomly generated binary code comprised in the memory, for the first user and the second user, respectively, depending on the value of respective pre-defined threshold set for the first user and the second user, results in a match for the successful verification of respective identities of the first user and the second user.

7. The system as claimed in claim 6, wherein size of an input layer (fc1_size) of the deep neural network is equal to size of the encrypted reduced dimensionality feature vector.

8. The system as claimed in claim 6, wherein size of an output layer of the deep neural network is based on number of bits comprised in each of a plurality of binary codes assigned to the user.

9. The system as claimed in claim 6, wherein the one or more hardware processors are further configured by the instructions to store, in a database comprised in the memory, (i) the encrypted RPM and (ii) the encrypted parameters of the mapping network model, and (iii) the corresponding randomly generated binary code in an encrypted form along with a unique label assigned to the user.

10. The system as claimed in claim 6, wherein the one or more hardware processors are further configured by the instructions to:

capture a second image comprising a biometric modality of the user for validating an identity of the user;

pre-process the captured second image comprising the biometric modality to obtain a second set of augmented images;

generate, via the one or more hardware processors, a feature vector for (a) each of the second set of augmented images and (b) the second captured image comprising the biometric modality of the user;

perform, by using the generated public key, the FHE on the feature vector for (a) each of the second set of augmented images and (b) the second captured image comprising the biometric modality of the user to obtain an encrypted feature vector for (a) each of the second set of augmented images and (b) the second captured image comprising the biometric modality of the user;

generate an encrypted reduced dimensionality feature vector for (a) each of the second set of augmented images and (b) the second captured image comprising the biometric modality of the user based on (i) the encrypted feature vector for (a) each of the second set of augmented images and (b) the second captured image comprising the biometric modality of the user, and (ii) the encrypted RPM assigned to the user during the enrollment;

generate, via the encrypted deep neural network, a set of encrypted prediction based binary codes based on (i) the encrypted reduced dimensionality feature vector for (a) each of the second set of augmented images and (b) the second captured image comprising the biometric modality of the user and (ii) the one or more encrypted parameters learnt by the deep neural network;

decrypt the set of encrypted prediction based binary codes by using the generated private key to obtain a set of decrypted binary codes;

perform the cryptographic hash function on the set of decrypted binary codes to obtain the set of cryptographic hash of binary code;

performing a comparison of each of the set of cryptographic hash of binary code with the corresponding cryptographic hash of the randomly generated binary code assigned to the user comprised in the memory; and validate the identity of the user based on the comparison.

11. One or more non-transitory machine-readable information storage mediums comprising one or more instructions which when executed by one or more hardware processors in a Trusted Execution Environment (TTE) cause registration and verification of biometric modalities using encryption techniques in a deep neural network by:

capturing a first image comprising a biometric modality of a user for enrollment; pre-processing the first captured image comprising the biometric modality to obtain a first set of augmented images;

generating, via the one or more hardware processors, a feature vector for (a) each of the first set of augmented images and (b) the first captured image comprising the biometric modality of the user and encrypting the generated feature vector thereof using a fully homomorphic encryption (FHE) technique;

generating, via the FHE technique executed by the one or more hardware processors, an encrypted reduced dimensionality feature vector using (i) the encrypted feature vector for (a) each of the first set of augmented images and (b) the first captured image comprising the biometric modality of the user and (ii) an encrypted Random Projection Matrix (RPM) being identified and assigned to the user, wherein the RPM is of dimension "k*d" to project an original "d" dimensional data to a "k" dimensional subspace through origin, wherein value of "k" is chosen less than value of "d", and wherein the assignment of the RPM is independent of the user and the biometric modality of the user; and mapping, via an encrypted deep neural network executed by the one or more hardware processors, the encrypted reduced dimensionality feature vector for (a) each of the first set of augmented images and (b) the first captured image comprising the biometric modality of the user with a corresponding randomly generated binary code assigned to the user, wherein during the mapping, one or more encrypted parameters of a mapping network model are learnt by the encrypted deep neural network, wherein a key pair is generated that comprises a private key and a public key, wherein a cryptographic hash function is performed on the corresponding randomly generated binary code to obtain a cryptographic hash of the corresponding randomly generated binary code that is stored in a memory, wherein each of a set of corresponding hash of binary code generated during verification of an identity of the user is compared with a cryptographic hash of the corresponding randomly generated binary code and a number of matches is estimated based on the comparison, wherein the user's identification is successfully verified if the number of matches is equal to or greater than a pre-defined threshold, and wherein value of the pre-defined threshold varies from user to user for comparison and the number of matches to be obtained for each user for successful verification, and wherein a number of comparisons, between each of the set of cryptographic hash of binary code obtained during the verification and the corresponding cryptographic hash of the corresponding randomly generated binary code comprised in the memory, for the first user and the second user, respectively, depending on the value of respective pre-defined threshold set for the first user and the second user, results in a match for the successful verification of respective identities of the first user and the second user.

12. The one or more non-transitory machine-readable information storage mediums of claim 11, wherein size of an input layer (fc1_size) of the encrypted deep neural network is equal to size of the encrypted reduced dimensionality feature vector.

13. The one or more non-transitory machine-readable information storage mediums of claim 11, wherein size of an output layer of the encrypted deep neural network is based on number of bits comprised in each of a plurality of binary codes assigned to the user.

14. The one or more non-transitory machine-readable information storage mediums of claim 11, wherein the instructions when executed by the one or more hardware processors further cause storing, in a database comprised in the memory, (i) the encrypted RPM and (ii) the encrypted parameters of the mapping network model, and (iii) the corresponding randomly generated binary code in an encrypted form along with a unique label assigned to the user.

15. The one or more non-transitory machine-readable information storage mediums of claim 11, wherein the instructions when executed by the one or more hardware processors further cause:

capturing a second image comprising a biometric modality of the user for validating an identity of the user;

pre-processing the captured second image comprising the biometric modality to obtain a second set of augmented images;

generating, via the one or more hardware processors, a feature vector for (a) each of the second set of augmented images and (b) the second captured image comprising the biometric modality of the user;

performing, by using the generated public key, the FHE on the feature vector for (a) each of the second set of augmented images and (b) the second captured image comprising the biometric modality of the user to obtain an encrypted feature vector for (a) each of the second set of augmented images and (b) the second captured image comprising the biometric modality of the user;

generating an encrypted reduced dimensionality feature vector for (a) each of the second set of augmented images and (b) the second captured image comprising the biometric modality of the user based on (i) the encrypted feature vector for (a) each of the second set of augmented images and (b) the second captured image comprising the biometric modality of the user and (ii) the encrypted RPM assigned to the user during the enrollment;

generating, via the encrypted deep neural network, a set of encrypted prediction based binary codes based on (i) the encrypted reduced dimensionality feature vector for (a) each of the second set of augmented images and (b) the second captured image comprising the biometric modality of the user and (ii) the one or more encrypted parameters learnt by the encrypted deep neural network;

decrypting the set of encrypted prediction based binary codes by using the generated private key to obtain a set of decrypted binary codes;

performing the cryptographic hash function on the set of decrypted binary codes to obtain the set of cryptographic hash of binary code and performing a comparison of each of the set of cryptographic hash of binary code with the corresponding cryptographic hash of the randomly generated binary code assigned to the user comprised in the memory; and validating the identity of the user based on the comparison.

* * * * *